United States Patent
Liu

(10) Patent No.: US 8,488,689 B2
(45) Date of Patent: Jul. 16, 2013

(54) CHANNEL EQUALIZATION IN A RECEIVER

(75) Inventor: Yan Liu, Shen Zhen (CN)

(73) Assignee: Shenzhen STS Microelectronics Co., Ltd., Shenzhen (CN)

(*) Notice: Subject to any disclaimer, the term of this patent is extended or adjusted under 35 U.S.C. 154(b) by 1071 days.

(21) Appl. No.: 12/079,950

(22) Filed: Mar. 28, 2008

(65) Prior Publication Data

US 2008/0285638 A1 Nov. 20, 2008

(30) Foreign Application Priority Data

Mar. 29, 2007 (CN) .......................... 2007 1 0089047

(51) Int. Cl.
*H04K 1/10* (2006.01)
(52) U.S. Cl.
USPC ........... 375/260; 375/262; 375/267; 375/299; 375/316; 375/322
(58) Field of Classification Search
USPC ................. 375/229, 230, 232, 242, 260, 267, 375/271, 285, 299, 316, 322, 326, 343–347, 375/349
See application file for complete search history.

(56) References Cited

U.S. PATENT DOCUMENTS

| | | | |
|---|---|---|---|
| 7,397,758 B1* | 7/2008 | Hart et al. | 370/208 |
| 7,573,944 B2* | 8/2009 | Chang et al. | 375/260 |
| 7,933,366 B2* | 4/2011 | Liu | 375/343 |
| 7,974,350 B2* | 7/2011 | Yoshida | 375/260 |
| 8,050,348 B2* | 11/2011 | Kim et al. | 375/267 |
| 8,229,011 B2* | 7/2012 | Xu | 375/260 |
| 8,391,413 B2* | 3/2013 | Mantravadi et al. | 375/316 |
| 2002/0159537 A1* | 10/2002 | Crilly, Jr. | 375/267 |
| 2005/0157801 A1* | 7/2005 | Gore et al. | 375/260 |
| 2006/0013326 A1* | 1/2006 | Yoshida | 375/260 |
| 2006/0221809 A1* | 10/2006 | Malladi et al. | 370/206 |

* cited by examiner

*Primary Examiner* — Hirdepal Singh
(74) *Attorney, Agent, or Firm* — Munck Wilson Mandala, LLP

(57) ABSTRACT

A method of estimating a channel response of a channel is provided that includes transforming a frequency domain signal received via the channel into a time domain signal and searching the time domain signal for a location of minimum energy. The method also includes padding the time domain signal with zeroes at the location of minimum energy and transforming the padded time domain signal to a second frequency domain signal. The second frequency domain signal is used as an estimated channel response for the channel.

17 Claims, 2 Drawing Sheets

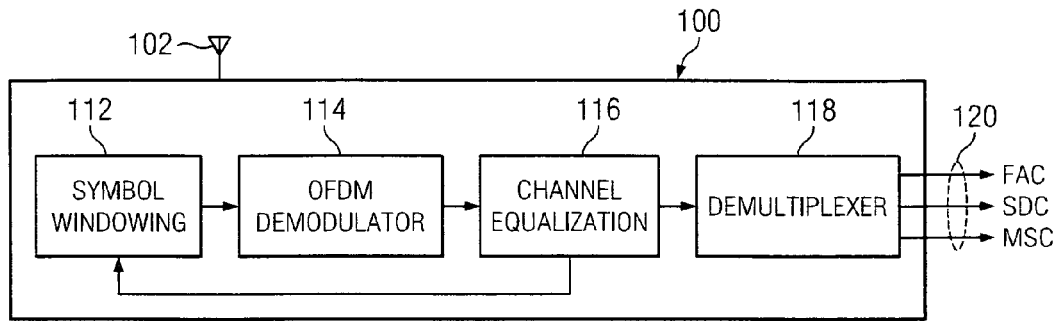
*FIG. 1*
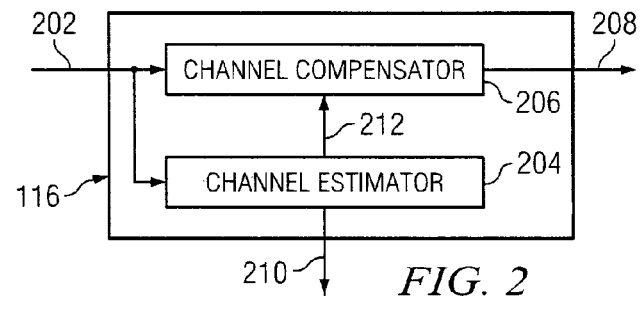
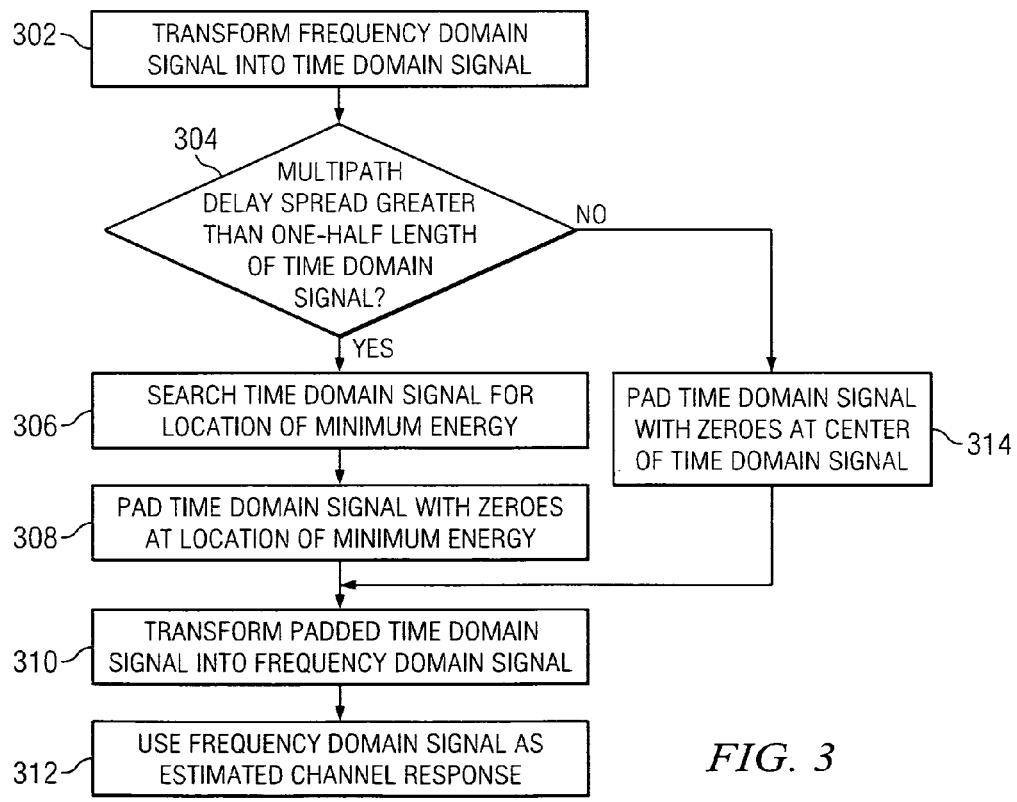
*FIG. 3*

CHANNEL EQUALIZATION IN A RECEIVER

CROSS-REFERENCE TO RELATED APPLICATION AND CLAIM OF PRIORITY

The present application claims the benefit under 35 U.S.C. §119(a) of a Chinese Patent Application filed in the Chinese Intellectual Property Office on Mar. 29, 2007 and assigned Serial No. 2007-10089047.X, the entire disclosure of which is hereby incorporated by reference.

TECHNICAL FIELD

The present disclosure generally relates to radio receivers, and more particularly to a method and apparatus for channel equalization in a radio receiver.

BACKGROUND

Digital Radio Mondiale (DRM) is an open standard digital radio system for short-wave, medium-wave and long-wave communication. Audio source signals are typically encoded into digital signals and may be multiplexed with other digital data for transmission. The multiplexed audio signals and digital data may then be encoded by Quadrature Amplitude Modulation (QAM) to create Main Service Channel (MSC) cells. A Fast Access Channel (FAC) signal that contains information needed to find services and begin decoding the multiplexed signal may also be encoded by QAM to create FSC cells. Furthermore, a Service Description Channel (SDC) signal that provides information to decode services in the DRM transmission and to find alternate sources of data may also be encoded by QAM to create SDC cells.

The MSC, FAC and SDC cells may then be combined and an orthogonal frequency-division multiplexing (OFDM) signal generator used to create OFDM symbols representing the cells. The OFDM symbols may then be used to modulate a radio frequency signal for transmission to DRM receivers.

The DRM standard defines four 'robustness modes' of operation, intended to provide robust transmission under four types of signal propagation conditions. The transmitted DRM signal includes a succession of OFDM symbols, each symbol being made of a guard interval followed by a part of the symbol containing transmitted data. Each symbol is the sum of K sine wave portions (or carriers) equally spaced in frequency. Each sine wave portion, called a "cell", is transmitted with a given amplitude and phase and corresponds to a carrier position. Each carrier is referenced by an index, or number.

The spacing between carrier frequencies and the number of carriers used to transmit a DRM signal are selected based upon a desired robustness mode of the signal and a desired frequency occupancy mode for the signal. The carriers are baseband signals and are used in a DRM transmitter to modulate a reference radio frequency signal.

A transmitted DRM signal is organized into transmission super frames. Each transmission super frame includes three transmission frames. A transmission frame includes a predetermined number of OFDM symbols, transmitted sequentially. The number of OFDM symbols is determined based upon a desired robustness mode, and is different for each mode. Under the DRM standard, a transmission frame may include pilot cells, control cells and data cells. The pilot cells (or reference cells) may be used for frame, frequency and time synchronization, channel estimation and robustness mode identification. Pilot cells are selected cells modulated with predetermined phases and amplitudes.

Gain reference cells (or gain pilots) are primarily used for coherent demodulation of a received DRM signal. Gain reference cells are spread throughout the OFDM symbols and may be used by a DRM receiver to estimate the channel response of the RF channel over which the DRM signal is received.

SUMMARY

In one embodiment, the present disclosure provides a method of estimating a channel response of a channel. The method includes transforming a first frequency domain signal received via the channel into a first time domain signal and searching the first time domain signal for a location of minimum energy. The first time domain signal is padded with zeroes at the location of minimum energy and transformed to a second frequency domain signal. The second frequency domain signal is used as an estimated channel response for the channel.

In another embodiment, the present disclosure provides a receiver. The receiver includes a demodulator and a channel equalizer. The demodulator is capable of demodulating a signal received from a channel to produce a first frequency domain signal. The channel equalizer is capable of transforming the first frequency domain signal into a first time domain signal and searching the first time domain signal for a location of minimum energy. The channel equalizer is also capable of padding the first time domain signal with zeroes at the location of minimum energy and transforming the padded time domain signal into a second frequency domain signal. The channel equalizer is further capable of using the second frequency domain signal as an estimated channel response for the channel.

In yet another embodiment, the present disclosure provides a channel equalizer for use in a receiver. The channel equalizer is adapted to transform a first frequency domain signal into a first time domain signal and search the first time domain signal for a location of minimum energy. The channel equalizer is further adapted to pad the first time domain signal by adding zero-value samples at the location of minimum energy to form a second time domain signal and transform the second time domain signal into a second frequency domain signal. The channel equalizer is further adapted to modify the first frequency domain signal according to the second frequency domain signal.

Other technical features may be readily apparent to one skilled in the art from the following figures, descriptions and claims.

BRIEF DESCRIPTION OF THE DRAWINGS

FIG. 1 is an exemplary functional block diagram of a receiver in accordance with one embodiment of the present disclosure;

FIG. 2 presents an exemplary functional block diagram of a channel equalizer in accordance with an embodiment of the present disclosure;

FIG. 3 shows an exemplary process for one-dimensional frequency axile interpolation according to the present disclosure that a channel equalizer may use to estimate a channel response;

DETAILED DESCRIPTION

Figure 4:
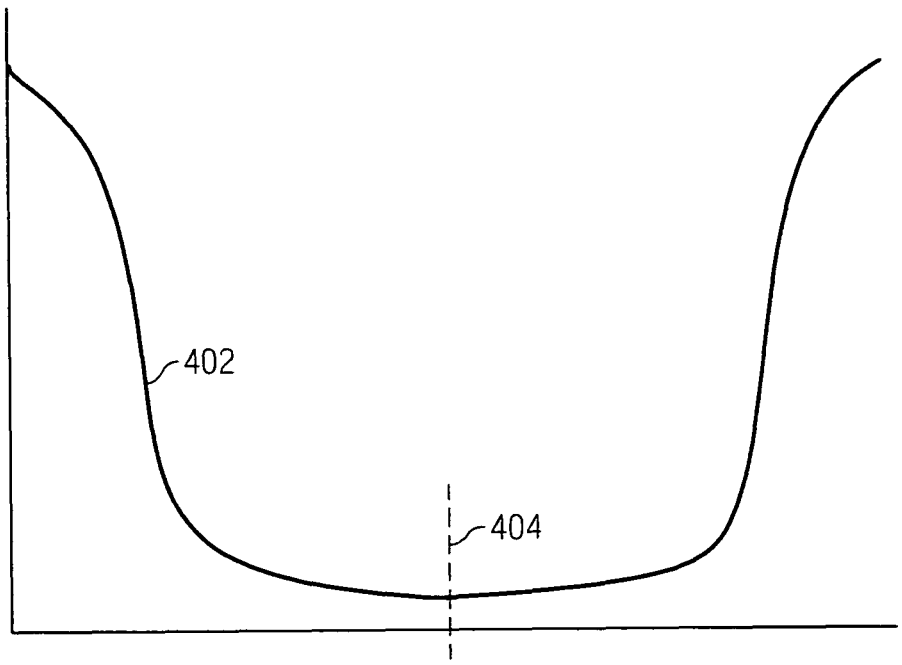
FIG. 4 illustrates an exemplary shape for a time domain transformation of a signal received on an RF channel having multipath delay spread that is not greater than one-half the length of the transformed time domain signal.

FIG. 1 is an exemplary functional block diagram of a Digital Radio Mondiale (DRM) receiver 100 in accordance with one embodiment of the present disclosure. The receiver 100 may receive RF signals via an antenna 102. During processing of the received signal, a rectangular windowing function 112 may be performed to isolate a time period that includes an OFDM symbol. The windowed, time domain signal may then be demodulated to a frequency domain OFDM symbol by an OFDM demodulator 114. A channel equalizer 116 may then operate on the frequency domain OFDM symbol to compensate for effects of the RF channel through which the RF signal was received. Information from the channel equalization process 116 may be supplied to the symbol windowing process 112 to correct for channel group delay experienced by the RF signal. The equalized signal produced by the channel equalizer 116 may then be separated by a demultiplexer 118 into Fast Access Channel (FAC), Service Description Channel (SDC) and Main Service Channel (MSC) signals.

FIG. 2 presents an exemplary functional block diagram of the channel equalizer 116 in accordance with an embodiment of the present disclosure. A frequency domain OFDM symbol 202 may be received by a channel estimator 204. The channel estimator 204 may process the frequency domain signal 202 to generate time channel response information 210 and frequency channel response information 212. The time channel response information 210 may be transmitted to other sections of the receiver 100. The frequency channel response information 212 may be sent to a channel compensator 206 that modifies the frequency domain OFDM symbol 202 to compensate for effects of the RF channel and produce an equalized OFDM signal 208.

Where the received signal is an OFDM symbol from a DRM signal, a subset of cells will be gain reference cells. Because these cells are transmitted with known gain and phase, they may be used to determine effects of the RF channel on the transmitted DRM signal. The gain pilots of an OFDM symbol may be used as a sample of the received signal, analyzed and interpolated in order to estimate the channel response at the other cells of the OFDM symbol.

FIG. 3 shows an exemplary process 300 for one-dimensional frequency axile interpolation according to the present disclosure that the channel equalizer 116 may use to estimate a channel response. In step 302, a frequency domain signal may be received and its channel response sampled at the gain reference cells by calculating $$\text{channel} = \frac{\text{gain\_pilot\_recieved}}{\text{gain\_pilot\_transmitted}}.$$

The sampled channel response in the frequency domain may then be transformed into a time domain signal. The sampled signal may be transformed by performing an inverse discrete Fourier transform (IDFT) on the signal.

Where the received signal has experienced a multipath delay spread in the RF channel that is not greater than one-half the length of the transformed time domain signal, the time domain signal may have a shape similar to that shown in FIG. 4. Where the multipath delay spread is greater than one-half the length of the transformed time domain signal, the time domain signal may have a more complex shape. An example of such a shape is shown in FIG. 5.

Because the gain reference cells are only a subset of the total number of cells in the OFDM symbol, the number of samples in the time domain signal may be increased to a number equal to or greater than the total number of cells in the OFDM symbol. In this way, a subsequent transform of the time domain signal into a frequency domain signal will serve to interpolate the sampled channel response information to provide estimated channel response information for each cell in the received OFDM symbol. Where the original number of samples in the time domain signal is X and the gain reference cells are separated by a carrier interval of Y, the number of samples in the time domain signal may be increased to X*Y samples.

Where the transformed time domain signal has the shape 402 shown in FIG. 4, the number of samples may be increased by inserting samples with a value of zero at a center 404 of the time domain signal. This may be referred to as 'padding' the signal with zeroes.

Figure 5:
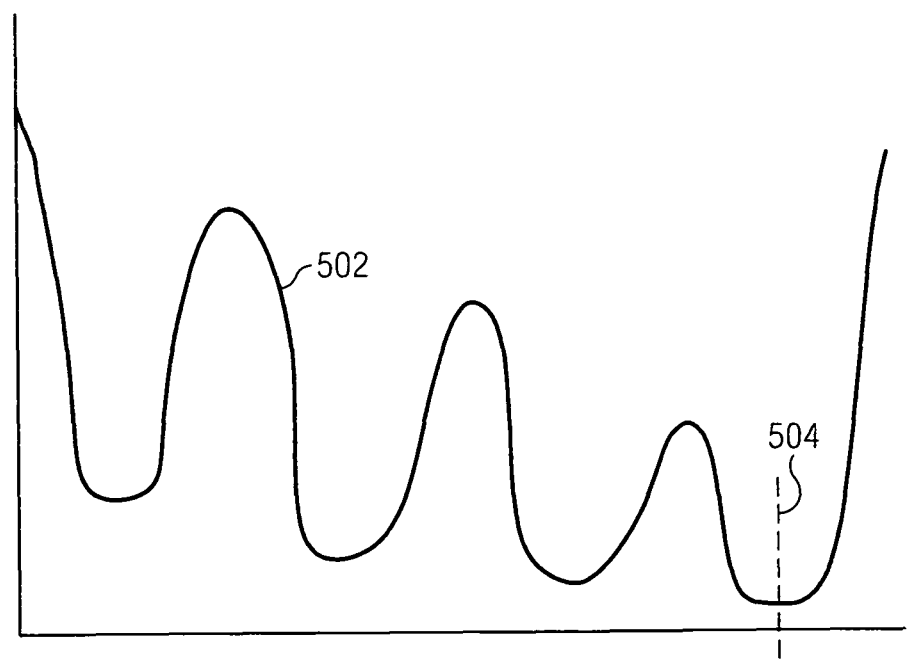
FIG. 5 depicts an exemplary shape for a time domain transformation of a signal received on an RF channel having

However, where the transformed time domain signal has the shape 502 shown in FIG. 5, padding the signal with zeroes at the middle of the signal may introduce errors in a subsequent step of transforming the time domain signal into a frequency domain signal to interpolate the estimated channel response. Instead, a more accurate interpolated channel response may be obtained by padding the signal with zeroes where the energy of the signal is at its minimum, as indicated by broken line 504.

Thus, in step 304, a determination is made whether the multipath delay spread in the RF channel is (or may be) greater than one-half the length of the time domain signal produced in step 302. This determination may be made by inspection of characteristics of the time domain signal. In the alternative, where the received signal is a DRM signal this determination may be based upon detection of the robustness mode that the signal is transmitted in.

As an example, in robustness mode C, the interval between gain pilots is four sub-carriers. As a result, the duration of the time domain signal is $$\frac{1}{f_{\text{gain\_pilot\_interval}}} = \frac{1}{4 * f_{sub-\text{carrier\_interval}}} = 0.25 * T_u$$

where $T_u$ is a duration of the so-called useful part of a DRM symbol. As such, a determination must be made whether the multipath delay spread in the RF channel is (or may be) greater than one-half of $0.25*T_u$, or $0.125*T_u$.

Because the gain pilot shift position by two carrier indices in each successive symbol in robustness mode C, a further interpolation technique may be used in another embodiment of the disclosure. This interpolation technique may increase the duration of the time domain signal by reducing the interval between gain pilots in the sampled channel response in the frequency domain. As an example of this technique, consider a sequence of symbols 1 through 4 transmitted in robustness mode C. In symbols 1 and 3, the gain pilots may be at carrier indices 1, 5, 9, 13 . . . , while in symbols 2 and 4, the gain pilots will be at carrier indices 3, 7, 11, 15 . . . .

In such a sequence of symbols, an estimated channel response may be directly sampled in symbols 1 and 3 by calculating $$channel = \frac{gain\_pilot\_recieved}{gain-pilot\_transmitted},$$

for carrier indices 1, 5, 9, 13 . . . . Similarly, an estimated channel response may be directly sampled in symbols 2 and 4 for carrier indices 3, 7, 11, 15 . . . .

A time axile interpolation of the direct samples of estimated channel response in symbols 1 and 3 may then be performed to produce interpolated samples of estimated channel response at carrier indices 1, 5, 9, 13 . . . in symbol 2. By combining the direct samples at carrier indices 3, 7, 11, 15 . . . with the interpolated samples at carrier indices 1, 5, 9, 13 . . ., the sampled channel response in the frequency domain for symbol 2 may have samples at carrier indices 1, 3, 5, 7, 9, 11, 13, 15 . . . .

Similarly, a time axile interpolation of the direct samples of estimated channel response in symbols 2 and 4 may be performed to produce interpolated samples of estimated channel response at carrier indices 3, 7, 11, 15 . . . in symbol 3. In this way, the sampled channel response in the frequency domain for symbol 3 may also have samples at carrier indices 1, 3, 5, 7, 9, 11, 13, 15 . . . .

The duration of a transformed time domain signal for such sampled channel responses in the frequency domain is correspondingly longer, because the directly sampled and interpolated gain pilots are at a carrier interval of 2, rather than 4. The calculation of time domain signal duration is thus:

$$\frac{1}{f_{gain\_pilot\_interval}} = \frac{1}{2*f_{sub-carrier\_interval}} = 0.5*T_u,$$

or twice the duration calculated above. In such an embodiment of the disclosure, a determination must be made whether the multipath delay spread in the RF channel is (or may be) greater than one-half of $0.5*T_u$, or $0.25*T_u$ to decide whether to pad the time domain signal at its center or at its location of minimum energy.

In each DRM robustness mode, a guard interval is inserted between DRM symbols to allow for expected signal conditions, including a possible level of multipath delay spread. In robustness mode C, the duration of the guard interval is defined as $$\frac{4}{11}*T_u,$$

to allow for multipath delay spread up to that length. Because $$\frac{4}{11}*T_u$$

is greater than both $0.125*T_u$ and $0.25*T_u$, the multipath delay spread in mode C cannot be assumed to be less than one-half the length of the time domain signal produced in step 302, regardless of whether time axile interpolation of the sampled channel responses in the frequency domain is performed. A similar analysis for robustness mode D produces similar results.

If, in step 304, it is determined that the multipath delay spread in the RF channel is not (or will not be) greater than one-half a length of the time domain signal produced in step 302, then in step 314 the time domain signal may be padded with zeroes at the midpoint of the signal. However, if it is determined that the multipath delay spread is (or may be) greater than one-half the length of the time domain signal, in step 306 the time domain signal may be searched for a location of minimum energy.

Such a search may be performed by forming a 'window' of a subset of contiguous samples in the time domain signal. A total energy of the window may be calculated by summing an energy of each of the samples in the window. The position of the window may then be changed by shifting to a different subset of contiguous samples and a total energy of that window calculated. A window having a lowest total energy may then be selected and a center point of that window chosen as a location of minimum energy for the time domain signal.

In step 308, the time domain signal may be padded with zeroes at the location chosen in step 306. In step 310, the time domain signal, as padded in either step 308 or step 314, may be transformed into a frequency domain signal. The padded time domain signal may be transformed by performing a discrete Fourier transform (DFT) on the signal. Finally, in step 312, the transformed frequency domain signal may be used as an estimated channel response for the RF channel.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of estimating a channel response of a channel, comprising:
    transforming a first frequency domain signal received via the channel into a first time domain signal;
    searching the first time domain signal for a location of minimum energy, the searching including:
        determining a total energy level for each of a plurality of groups of contiguous samples of the first time domain signal, and
        selecting a center of a group of contiguous samples having a lowest total energy level as the location of minimum energy;
    padding the first time domain signal by adding zero-value samples at the location of minimum energy to form a second time domain signal;
    transforming the second time domain signal into a second frequency domain signal; and using the second frequency domain signal as the estimated channel response for the channel,
determining a total energy level for each of a plurality of groups of contiguous samples of the first time domain signal; and
selecting a center of a group of contiguous samples having a lowest total energy level as the location of minimum energy.

2. The method of claim 1, wherein transforming a first frequency domain signal further comprises performing an inverse discrete Fourier transform operation on the first frequency domain signal.

3. The method of claim 2, wherein transforming the second time domain signal comprises performing a discrete Fourier transform operation on the second time domain signal.

4. The method of claim 1, wherein using the second frequency domain signal as an estimated channel response comprises modifying the first frequency domain signal according to the second frequency domain signal.

5. A method of estimating a channel response of a channel, comprising:
transforming a first frequency domain signal received via the channel into a first time domain signal;
searching the first time domain signal for a location of minimum energy;
padding the first time domain signal by adding zero-value samples at the location of minimum energy to form a second time domain signal;
transforming the second time domain signal into a second frequency domain signal;
using the second frequency domain signal as the estimated channel response for the channel;
determining whether a multipath delay spread of the channel is greater than one-half a length of the first time domain signal; and
wherein
searching the first time domain signal for a location of minimum energy and padding the first time domain signal by adding zero-value samples at the center location of minimum energy are performed only if the multipath delay spread of the channel is greater than one-half a length of the first time domain signal, and
if the multipath delay spread of the channel is not greater than one-half the length of the first time domain signal, the first time domain signal is padded by adding zero-value samples at a center of the first time domain signal.

6. A method of estimating a channel response of a channel, comprising:
transforming a first frequency domain signal received via the channel into a first time domain signal;
searching the first time domain signal for a location of minimum energy;
padding the first time domain signal by adding zero-value samples at the location of minimum energy to form a second time domain signal;
transforming the second time domain signal into a second frequency domain signal;
using the second frequency domain signal as the estimated channel response for the channel; and
wherein
the first frequency domain signal is a signal in an orthogonal frequency-division multiplexing (OFDM) format, and
padding the first time domain signal by adding zero-value samples at the location of minimum energy further comprises adding a predetermined number of zero-value samples such that an estimated channel response may be determined at each of the sub-carriers of the OFDM signal.

7. A receiver, comprising:
a demodulator configured to demodulate a signal received from a channel to produce a first frequency domain signal; and
a channel equalizer configured to:
transform the first frequency domain signal into a first time domain signal;
search the first time domain signal for a location of minimum energy, the search including:
determining a total energy level for each of a plurality of groups of contiguous samples of the first time domain signal, and
selecting a center of a group of contiguous samples having a lowest total energy level as the location of minimum energy;
pad the first time domain signal by adding zero-value samples at the location of minimum energy to form a second time domain signal;
transform the second time domain signal into a second frequency domain signal; and
use the second frequency domain signal as an estimated channel response for the channel.

8. The receiver of claim 7, wherein the channel equalizer is further configured to perform an inverse discrete Fourier transform operation on the first frequency domain signal.

9. The receiver of claim 8, wherein the channel equalizer is further configured to perform a discrete Fourier transform operation on the second time domain signal.

10. The receiver of claim 7, wherein the channel equalizer is further configured to modify the first frequency domain signal according to the second frequency domain signal.

11. A receiver, comprising:
a demodulator configured to demodulate a signal received from a channel to produce a first frequency domain signal; and
a channel equalizer configured to:
transform the first frequency domain signal into a first time domain signal;
search the first time domain signal for a location of minimum energy;
pad the first time domain signal by adding zero-value samples at the location of minimum energy to form a second time domain signal;
transform the second time domain signal into a second frequency domain signal;
use the second frequency domain signal as an estimated channel response for the channel; and
wherein the channel equalizer is further configured to:
determine whether a multipath delay spread of the channel is greater than one-half a length of the first time domain signal;
search the first time domain signal for a location of minimum energy and padding the first time domain signal by adding zero-value samples at the center location of minimum energy only if the multipath delay spread of the channel is greater than one-half a length of the first time domain signal; and
pad the first time domain signal by adding zero-value samples at a center of the first time domain signal if the multipath delay spread of the channel is not greater than one-half the length of the first time domain signal.

12. A receiver, comprising:
a demodulator configured to demodulate a signal received from a channel to produce a first frequency domain signal; and
a channel equalizer configured to:
   transform the first frequency domain signal into a first time domain signal;
   search the first time domain signal for a location of minimum energy;
   pad the first time domain signal by adding zero-value samples at the location of minimum energy to form a second time domain signal;
   transform the second time domain signal into a second frequency domain signal;
   use the second frequency domain signal as an estimated channel response for the channel; and
   wherein the first frequency domain signal is a signal in an orthogonal frequency-division multiplexing (OFDM) format and the channel equalizer is further configured to pad the first time domain signal by adding a predetermined number of zero-value samples such that an estimated channel response may be determined at each of the sub-carriers of the OFDM signal.

13. A channel equalizer for use in a receiver, the channel equalizer configured to:
   transform a first frequency domain signal into a first time domain signal;
   search the first time domain signal for a location of minimum energy, the search including:
      determining a total energy level for each of a plurality of groups of contiguous samples of the first time domain signal, and
      selecting a center of a group of contiguous samples having a lowest total energy level as the location of minimum energy;
   pad the first time domain signal by adding zero-value samples at the location of minimum energy to form a second time domain signal;
   transform the second time domain signal into a second frequency domain signal; and
   modify the first frequency domain signal according to the second frequency domain signal.

14. The channel equalizer of claim 13, wherein the channel equalizer is further configured to perform an inverse discrete Fourier transform operation on the first frequency domain signal.

15. The channel equalizer of claim 14, wherein the channel equalizer is further configured to perform a discrete Fourier transform operation on the second time domain signal.

16. A channel equalizer for use in a receiver, the channel equalizer configured to:
   transform a first frequency domain signal into a first time domain signal;
   search the first time domain signal for a location of minimum energy;
   pad the first time domain signal by adding zero-value samples at the location of minimum energy to form a second time domain signal;
   transform the second time domain signal into a second frequency domain signal;
   modify the first frequency domain signal according to the second frequency domain signal; and
   wherein the channel equalizer is further configured to:
      determine whether a multipath delay spread of the channel is greater than one-half a length of the first time domain signal;
      search the first time domain signal for a location of minimum energy and pad the first time domain signal by adding zero-value samples at the center location of minimum energy only if the multipath delay spread of the channel is greater than one-half a length of the first time domain signal; and
      pad the first time domain signal by adding zero-value samples at a center of the first time domain signal if the multipath delay spread of the channel is not greater than one-half the length of the first time domain signal.

17. A channel equalizer for use in a receiver, the channel equalizer configured to:
   transform a first frequency domain signal into a first time domain signal;
   search the first time domain signal for a location of minimum energy;
   pad the first time domain signal by adding zero-value samples at the location of minimum energy to form a second time domain signal;
   transform the second time domain signal into a second frequency domain signal;
   modify the first frequency domain signal according to the second frequency domain signal; and
   wherein the first frequency domain signal is a signal in an orthogonal frequency-division multiplexing (OFDM) format and the channel equalizer is further configured to pad the first time domain signal by adding a predetermined number of zero-value samples such that an estimated channel response may be determined at each of the sub-carriers of the OFDM signal.

* * * * *